(12) United States Patent
Heymans et al.

(10) Patent No.: US 9,317,585 B2
(45) Date of Patent: Apr. 19, 2016

(54) SEARCH QUERY SUGGESTIONS BASED ON PERSONAL INFORMATION

(71) Applicant: Google Inc., Mountain View, CA (US)

(72) Inventors: Maureen Heymans, San Francisco, CA (US); Ashutosh Shukla, Mountain View, CA (US); Harish Rajamani, Sunnyvale, CA (US); Matthew E. Kulick, San Francisco, CA (US); Bryan C. Horling, Sunnyvale, CA (US); Jennifer E. Fernquist, San Francisco, CA (US)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 13/833,467

(22) Filed: Mar. 15, 2013

(65) Prior Publication Data
US 2014/0280107 A1 Sep. 18, 2014

(51) Int. Cl.
*G06F 17/30* (2006.01)
(52) U.S. Cl.
CPC ...... *G06F 17/3064* (2013.01); *G06F 17/30867* (2013.01)
(58) Field of Classification Search
CPC .................. G06F 17/30943; G06F 17/3097
USPC .......................................... 707/767, 705, 706
See application file for complete search history.

(56) References Cited

U.S. PATENT DOCUMENTS

| 7,630,976 B2 | 12/2009 | Zhang |
| 7,827,170 B1 | 11/2010 | Horling |
| 8,027,964 B2 * | 9/2011 | Boulis ........................... 707/705 |
| 8,166,016 B2 * | 4/2012 | Higgins et al. ................ 707/706 |
| 8,612,433 B2 | 12/2013 | Kang |
| 2007/0088686 A1 * | 4/2007 | Hurst-Hiller et al. ............. 707/4 |
| 2011/0051986 A1 * | 3/2011 | Koch ............................. 381/400 |
| 2011/0054986 A1 * | 3/2011 | Rubin et al. .................. 705/14.2 |
| 2011/0055189 A1 | 3/2011 | Effrat et al. |
| 2012/0131032 A1 * | 5/2012 | Rakshit ......................... 707/767 |
| 2013/0054631 A1 * | 2/2013 | Govani et al. ................. 707/767 |
| 2013/0151533 A1 * | 6/2013 | Udupa et al. .................. 707/742 |
| 2013/0238612 A1 * | 9/2013 | Tsongas ............ G06F 17/30867 707/723 |
| 2013/0339380 A1 * | 12/2013 | Meschkat ...................... 707/767 |
| 2014/0188926 A1 * | 7/2014 | Chandel et al. ............... 707/767 |
| 2014/0244661 A1 * | 8/2014 | Peiris et al. ................... 707/748 |

OTHER PUBLICATIONS

International Search Report and Written Opinion in International Application No. PCT/US2014/018682, mailed May 26, 2014, 11 pages.

* cited by examiner

*Primary Examiner* — Baoquoc N To
(74) *Attorney, Agent, or Firm* — Fish & Richardson P.C.

(57) ABSTRACT

Methods, systems, and apparatus, including computer programs encoded on a computer storage medium, for receiving a query initial input from a user, in response to receiving the query initial input, determining a set of personalized query suggestions based on the query initial input, the set of personalized query suggestions including one or more content-based query suggestions that reflect at least one of user data associated with the user within one or more computer-implemented services and use of the one or more computer-implemented services by the user, and transmitting instructions to display the set of personalized query suggestions to the user.

27 Claims, 6 Drawing Sheets

SEARCH QUERY SUGGESTIONS BASED ON PERSONAL INFORMATION

BACKGROUND

The present disclosure relates to searching.

Internet search engines provide information about Internet accessible resources (e.g., Web pages, images, text documents, and multimedia content) that are responsive to a user's search query by returning a set of search results in response to the query. A search result may include, for example, a Uniform Resource Identifier (URI) and a snippet of information for resources responsive to a query.

Some Internet search engines provide search suggestions as a user is entering a query. These search suggestions generally correspond to possible completions and/or possible matches to the user's input. For example, if a user types "formic acid prop," a search engine may suggest the query completion "formic acid properties" and/or the query match "properties of formic acid." These search suggestions can be presented, for example, in a drop down box that lists the search suggestions.

SUMMARY

Implementations of the present disclosure are generally directed to providing personalized query suggestions based on user data associated with a user and/or one or more computer-implemented services used by the user. More particularly, one or more personalized query suggestions can be provided to the user for selection and can be determined based on an initial input by the user. In some implementations, respective ranking scores can be provided for each query suggestion and the query suggestions can be displayed in rank order based on the ranking scores. In some examples, ranking scores can be determined based on the computer-implemented services with which the user interacts and/or the user data. Example computer-implemented services can include an electronic mail service, a chat service, a video conferencing service, a document sharing service, a photo sharing service, a video sharing service, a social networking service, a calendar service, a contact management service, and any appropriate combinations thereof. In some examples, the user data can be information that has been provided to the user and/or generated by the user through the computer-implemented services.

In some implementations, a plurality of personalized query suggestions can be provided based on the initial input. In some examples, the initial input can include an n-gram of characters input by the user. In some implementations, the personalized query suggestions are identified from an index of personalized query suggestions that is associated with a user of a search service. In some implementations, non-personalized query suggestions are based on other criteria. The personalized query suggestions can be ranked along with the non-personalized query suggestions, or the personalized and non-personalized query suggestions can be ranked separately and presented in a tiered arrangement, e.g., all personalized query suggestions first in rank order, followed by all non-personalized query suggestions in rank order.

In general, innovative aspects of the subject matter described in this specification can be embodied in methods that include actions of receiving a query initial input from a user, in response to receiving the query initial input, determining a set of personalized query suggestions based on the query initial input, the set of personalized query suggestions including one or more content-based query suggestions that reflect at least one of user data associated with the user within one or more computer-implemented services and use of the one or more computer-implemented services by the user, and transmitting instructions to display the set of personalized query suggestions to the user. Other implementations of this aspect include corresponding systems, apparatus, and computer programs, configured to perform the actions of the methods, encoded on computer storage devices.

These and other implementations can each optionally include one or more of the following features: actions further include determining a rank order of personalized query suggestions in the set of personalized query suggestions, the personalized query suggestions being displayed in the rank order; the rank order is determined based on at least one of a relevance, frequency of use of services, and user content associated with services; the rank order is based on types of query suggestions in the set of personalized query suggestions; each of the one or more content-based query suggestions is associated with a computer-implemented service of the one or more computer-implemented services, with which the user has a level of engagement that exceeds a threshold level of engagement; actions further include receiving a selection of a query suggestion from the set of personalized query suggestions and, in response, retrieving one or more search results that are responsive to the query suggestion; actions further include: identifying the query suggestion as a highest ranking query suggestion, wherein the selection is an automatic selection in response to the query suggestion being the highest ranking query suggestion, and transmitting instructions to display one or more search results associated with the highest ranking query suggestion as preliminary search results; the set of personalized query suggestions further includes one or more history-based query suggestions, each history-based query suggestion reflecting a query previously submitted by the user; and the one or more content-based query suggestions include at least one of content generated by the user within one or more computer-implemented services, content received by the user within the one or more computer-implemented services, and indicating use by the user of the one or more computer-implemented services.

Particular implementations of the subject matter described in this specification can be implemented so as to realize one or more of the following advantages. Users are assisted in formulating personalized search queries. More particularly, personalized query formulation can be a difficult task, as users may not be aware of the personalized search features provided by the search service. Consequently, users may not utilize the full potential of personalized search queries, resulting in search results that might be less useful to the user. As discussed herein, implementations of the present disclosure provide personalized assistance to the user in formulating search queries based on the services they use, the user information provided through the services, and available user information. In this manner, relevant search queries can be suggested to the user that can be used to enhance the relevancy of the search results presented to the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
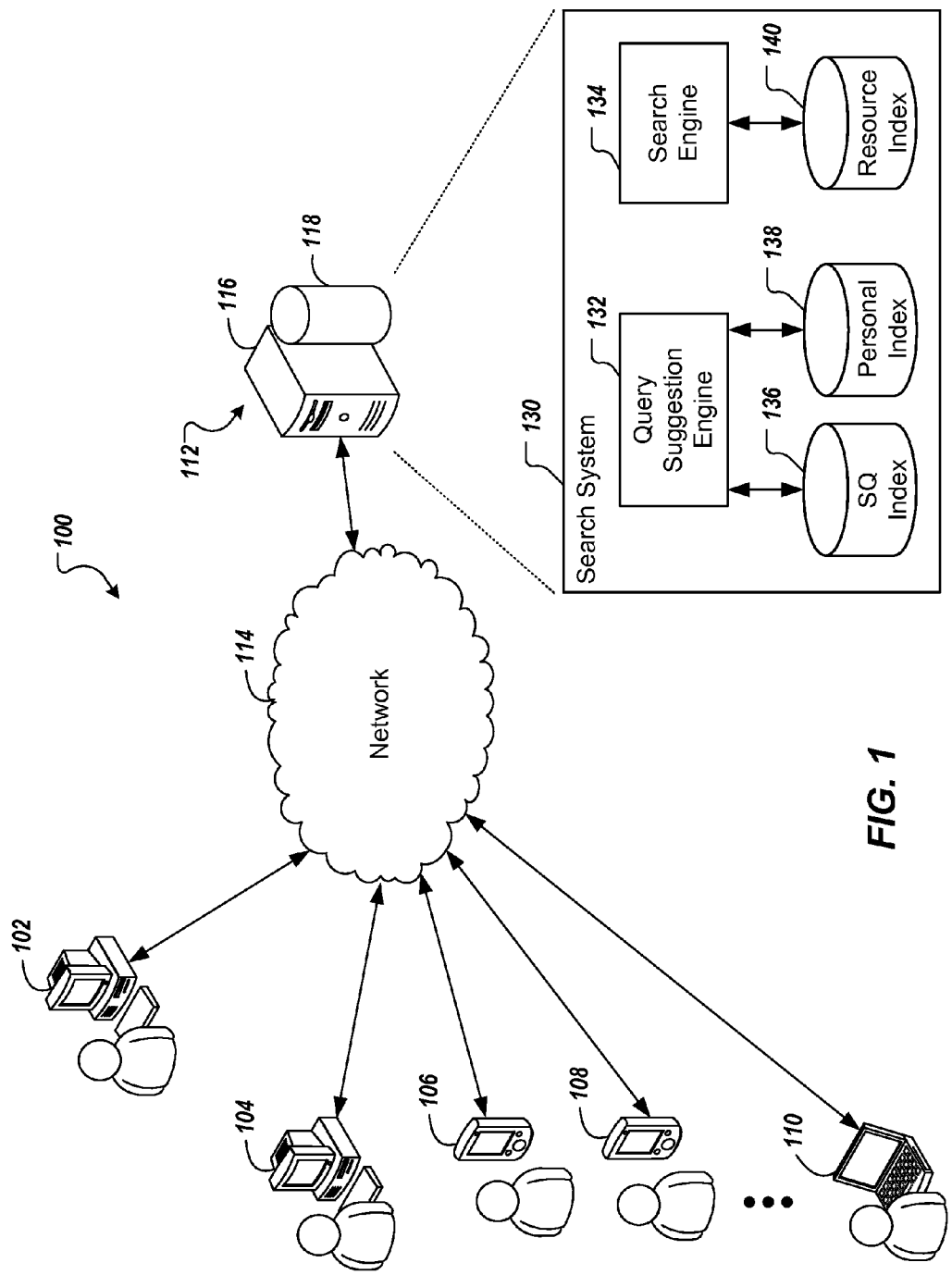
FIG. 1 is a diagram of an example network architecture.

FIG. 1 is a diagram of an example network architecture 100. The network architecture 100 includes a number of client devices 102-110 communicably connected to a server system 112 by a network 114. The server system 112 includes a processing device 116 and a data store 118. The processing device 116 executes computer instructions (e.g., resource search program code) stored in the data store 118 to perform the functions of one or more computer-implemented services (e.g., a search service).

In some implementations, the client devices 102-110 can be provided as computing devices such as laptop or desktop computers, smartphones, personal digital assistants, portable media players, tablet computers, or other appropriate computing devices. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Users of the client devices 102-110 can access the one or more computer-implemented services provided by the server system 112 and/or other server systems (not shown). Example computer-implemented services can include search services, electronic message services, instant messaging (chat) services, social networking service, blogging services, and digital content sharing services. In some examples, users of the client devices 102-110 can be contacts of one another in one or more of the computer-implemented services. Consequently, each user can be associated with a user-specific social graph, discussed in further detail herein, that is at least partially defined based on user interaction through the computer-implemented services.

In some examples, the server system 112 can host a search service provided by a search system 130. In some examples, the search system 130, and components thereof, can be provided as one or more computer programs that can be executed using one or more processors. In the depicted example, the search system 130 includes a query suggestion engine 132, a search engine 134, a suggested queries (SQ) index 136, a user index 138 and a resource index 140. In some examples, one or more components can be combined. For example, the search engine 134 can include the query auto-completion engine 132, the SQ index 136, the personal index 138 and/or the resource index 140.

In some implementations, the query suggestion engine 132 can process an initial search query input provided by a searching user to identify one or more query suggestions and to provide at least one of the one or more query suggestions for display to the user, as discussed in further detail herein. In some examples, the query suggestion engine 132 retrieves information from the SQ index 136 and/or the personal index 138. In some examples, the SQ index 136 includes a plurality of query suggestions that might be responsive to one or more initial inputs received at the search system 130.

In some implementations, the SQ index 136 includes queries that are provided as search queries by one or more users of the search service. In this manner, the SQ index 136 provides a body of queries that can be accessed based on an initial search query associated with the searching user, an identifier identifying the user, a location of the user, and/or any other attribute or combination of attributes associated with the searching user, the initial search query, or any other suitable piece of information. In some examples, the query suggestions provided in the SQ index 136 can be updated relatively frequently. In some examples, the SQ index 136 can be updated in response to a threshold number of queries being received and/or after a threshold time has lapsed since being last updated. For example, because the query suggestions are provided based at least in part on search queries that users submit to the search system, search suggestions can be frequently added to the SQ index 136. In some implementations, a relevance of each query suggestion to the searching user can be determined. In some cases, the relevance may be dynamic.

In some examples, the query suggestion engine 132 generates one or more suggestions on-the-fly, based on processing of the initial search query input. In some examples, the user index 138 includes user-specific information related to one or more services used by the user. For example, the user index 138 may include calendar appointments entered by the user into a calendar service, electronic messages received and sent by the user using an electronic message service, or any other suitable user information. In some implementations, the user index 138 can be a collection of different indexes associated with one or more services used by the user. For example, an electronic message service and a calendar service may each maintain their own separate indexes, both of which may be included in the user index 138. In some examples, the user index 138 can store a copy of the data from the individual service indexes. In some examples, the user index 138 can include pointers and/or links to the separate service indexes.

In some implementations, the user index 138 may include individual entries or data items associated with the different services used by the user. For example, the user index 138 can include electronic messages sent or received by the user, calendar entries stored by the user, reservations made by the user, purchases made by the user, tickets to events purchased by the user, photos uploaded by the user, documents uploaded by the user, social network posts submitted by the user, and/or any other suitable data items associated with the different services.

In some implementations, the search engine 134 can process an initial input and/or a search query to generate relevant search results. In some examples, the search results include representations of and hyperlinks to one or more resources that are available over the network 114. Example resources can include web pages, images, videos, files and/or any other appropriate digital content available over the network 114. In some examples, the resource index 140 includes information regarding resources that are available over the network 114 and a Uniform Resource Identifier (URI) (e.g., a Uniform Resource Locator (URL)) associated with each resource. In some examples, search results responsive to the initial input and/or the search query can be provided for display to searching users and can include information provided from the resource index 140.

In accordance with implementations of the present disclosure, one or more query suggestions, personal query suggestions, can be provided to a searching user of a computer-implemented search service, at least one of the one or more search suggestions being provided based at least in part on information that is specific to the searching user. In some examples, the user can provide an initial search query input to the search service, the initial input being provided as a sequence of characters. The search service can identify one or more query suggestions based on the initial input and the information specific to the user. In some examples, a plurality of query suggestions is identified based on the initial input. As discussed in further detail herein, personal query-suggestions can include content-based query suggestions and history-based query suggestions.

In some implementations, content-based personal query suggestions can be provided based on content provided by the user and/or by other users within one or more computer-implemented services. Consequently, content-based query suggestions indicate content associated with the user through one or more computer-implemented services. As introduced above, example computer-implemented services can include search services, electronic message services, instant messaging (chat) services, social networking service, blogging services, calendar services, and digital content sharing services, e.g., video sharing services, image sharing service, document sharing services. In some examples, a user can provide, e.g., generate, user-provided content within a service. For example, a user can send and/or receive electronic messages within the electronic message service. As another example, a user can write and distribute social networking posts in the social networking service. As another example, a user can share images, videos and/or documents with other users in the content sharing service. Example content-based query suggestions can include [my email], [my posts] and/or [my photos], reflecting use of an electronic message service, a social networking service, and an image sharing service.

In some examples, content-based query suggestions can be provided based on entities and/or attributes associated with user-provided content. Example entities can include an airline, a hotel, a restaurant, a product, and an event, e.g., a theater performance, a concert, a sporting event. For example, a user can book a flight on an airline and can receive an electronic message in an electronic message service confirming the booking and/or can enter flight information as a calendar entry in a calendar service. Continuing with this example, the user can provide initial input of [consolidated], and an example content-based personal query suggestion can be provided as [my flights on consolidated airlines], reflecting a booking with the fictitious airline Consolidated Airlines. As another example, a user can make a reservation at a restaurant, e.g., an online reservation, and can receive an electronic message in an electronic message service confirming the reservation. Continuing with this example, the user can provide initial input of [good food], and an example content-based personal query suggestion can be provided as [my reservation at good food], reflecting a reservation with the fictitious restaurant Good Food.

In some implementations, content-based query suggestions can be provided based on a level of engagement with the one or more computer-implemented services. In some examples, a level of engagement associated with a particular service can be determined based on a number of times the user has used the service, and/or a frequency of use of the service. In some examples, if the user has never used a particular service, the level of engagement can be provided as a minimum value. In some examples, if the user frequently uses the particular service, the level of engagement can be provided as a maximum. In some examples, the level of engagement of a particular user with a particular service can range between the minimum value and the maximum value.

In some examples, whether content-based personal query suggestions are to be provided for content associated with particular computer-implemented service can be determined based on an amount of user-associated content for a particular service and/or the level of engagement with the particular service. For example, a user can be associated with a number of content, e.g., electronic messages, images, videos, documents, within a particular service. In some examples, if the number of content exceeds a threshold number, content-based query suggestions reflecting the particular service can be provided. As another example, a level of engagement of the user with the particular service can be compared to a threshold level of engagement. In some examples, if the level of engagement exceeds the threshold level of engagement, content-based query suggestions reflecting the particular service can be provided. In some examples, content-based query suggestions reflecting a particular service are only provided if the number of content exceeds the threshold number and the level of engagement exceeds the threshold level of engagement. In some examples, content-based query suggestions reflecting a particular service are only provided if the number of content exceeds the threshold number. In some examples, content-based query suggestions reflecting a particular service are only provided if the level of engagement exceeds the threshold level of engagement.

In some examples, personal query suggestions can include history-based query suggestions. In some examples, and in contrast to content-based query suggestions, history-based query suggestions include search queries previously submitted by the user. In some examples, history-based query suggestions exclusively include search queries previously submitted by the user during previous use of the search service. For example, if the user had previously submitted the query [my email from john friend], the query [my email from john friend] can be provided as a history-based query suggestion in response to initial input, e.g. [email].

In some implementations, query suggestions can be provided in a rank order. In some examples, query suggestions can be ordered based on type. In some examples, history-based query suggestions can be ranked higher than content-based query suggestions. For example, example personal query suggestions can include [my email from john friend] as a history-based query suggestion, and [my email] as a content-based query suggestion. Consequently, the query suggestion [my email from john friend] can be ranked higher than the query suggestion [my email]. In some examples, content-based query suggestions can be ranked higher than history-based query suggestions. Using the example above, the query suggestion [my email] can be ranked higher than the query suggestion [my email from john friend].

In some implementations, for each query suggestion, a ranking score can be provided. In some examples, the ranking score can be at least partially based on user-specific information. In some examples, the ranking score can be at least partially based on type of query suggestion, e.g., content-based or history-based. In some implementations, a rank order of query suggestions is determined based on the ranking scores, and query suggestions can be displayed to the user in the rank order. In some implementations, the query suggestions can be provided in ranked tiers associated with the different types of query suggestions. For example, previous searches performed by the user can be provided in a first tier and can be presented more prominently (e.g., first) in the list of query suggestions. In some examples, query suggestions that are based on the user-specific information can be presented in a second tier. In some examples, query suggestions based on other factors, e.g., aggregate user search activity, can be presented in a third tier. In some examples, preview search results can be generated based on a highest ranking query suggestion and can be displayed to the user.

In some implementations, and as discussed above, the query suggestions can reflect frequently used services associated with the user. For example, if the user searches for [photos], the system can include the query suggestion [my photos]. In some examples, the query suggestion [my photos] can be provided in response to determining that the searching user uses a computer-implemented image sharing service. In another example, if the user searches for [tickets], the system may include the query suggestion [my tickets]. In some examples, the query suggestion [tickets] can be provided in response to determining that the searching user uses a computer-implemented ticket service.

In some implementations, user-specific information related to use of computer-implemented services is provided in an index. As discussed herein, such an index can be used for storing and managing user-specific information for providing query suggestions. In some examples, user-specific information related to computer-implemented services may also be stored in indexes associated with the computer-implemented services themselves. In some examples, an index can be provided as a database, a collection of databases, and/or tables or other structures within a database for storing information. In some implementations, each of the computer-implemented services can provide an application programming interface (API) that can be used to retrieve user-specific information for providing query suggestions.

As discussed above, the search service can present query suggestions based on use of computer-implemented services. In some examples, a frequency of use of a computer-implemented service can reflect relevance to an associated search query. In some examples, frequency of use can influence a position of a query suggestion in a query suggestion list. In some examples, frequency of use can be determined based on a number of times the user has interacted with the particular computer-implemented service, the amount of data the user has entered or stored in the particular computer-implemented service, and/or any other suitable metric.

In some implementations, a query suggestion can include a link to an underlying computer-implemented service, and/or link to a data item within the computer-implemented service. For example, if the user searches for [my email], the search service can present the user with a query suggestion of [my email to John Smith] associated with an electronic message that the user has received from John Smith. In another example, if the user enters [Locanda], a resort that the user has reserved a vacation to, the query suggestion [my reservation at Locanda] can be displayed and can be associated with a link to the user's reservation.

In some implementations, query suggestions based on use of computer-implemented services can also be associated with a link to an external site or resource associated with the data item. For example, if the user has recently purchased a flight on the airline "Consolidated Airlines," the search query [consolidated] can provide a query suggestion of [my flight on consolidated], which can be associated with a link to a website of the airline.

In some examples, query suggestions can be presented to a searching user who is not logged into the search service, e.g., a non-authenticated user. In some implementations, the query suggestions for a non-authenticated user can include query suggestions associated with one or more computer-implemented services. For example, a query suggestion can be associated with a computer-implemented service and can include a "sign in" link, inviting the user to sign into the particular computer-implemented service. In some examples, query suggestions in such examples can be ranked according to the popularity of the services in the overall user base.

By way of example, a searching user inputs the initial input [photos] to a search box of a search service. In response to the initial input, a set of query suggestions can be identified. The query suggestions can include searches that the user has previously performed, e.g., history-based query suggestions, popular search queries submitted to the search service, and content-based query suggestions based on the initial input. In some examples, the query suggestions can be ordered such that the history-based query suggestions appear first in the list, followed by the content-based query suggestions, e.g., ordered by relevance, followed by the popular search queries, e.g., ordered by relevance.

Figure 2:
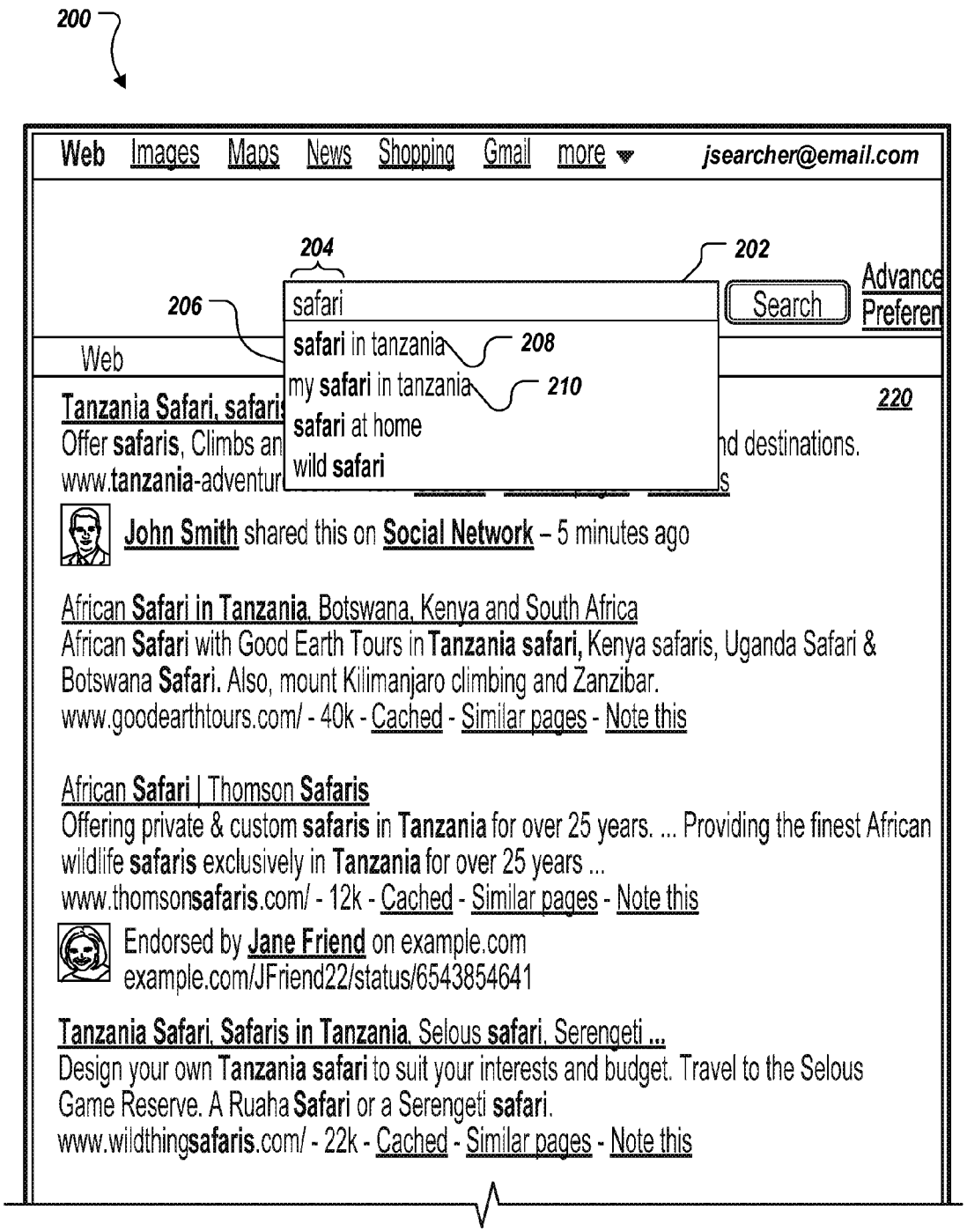
FIG. 2 is a representation of an example search results page including example personalized query suggestions.

FIG. 2 is a representation of an example search results page 200 including example personalized query suggestions. The search results page 200 is depicted as an example search results page of an example search service. The search results page 200 includes a search box 202 into which a searching user can input search terms. In the depicted example, the searching user is logged into the search service and has entered an initial input 204 into the search box 202. In the depicted example, the word "safari" is provided as the example initial input 202. The initial input 202 and an identifier (ID) associated with the searching user (e.g., jsearcher@email.com), and/or a cookie associated with a computing device of the searching user can be provided to a search system, e.g., the search system 130 of FIG. 1. As discussed in further detail herein, the initial input 202 can be processed to identify a plurality of query suggestions at least partially based on user-specific information.

In some implementations, the initial input can be processed by a query suggestion engine, e.g., the query suggestion engine 132 of FIG. 1, to identify a plurality of query suggestions that might be relevant to the initial input. In some examples, the initial input is provided as input to a database of search suggestions, e.g., the query suggestion index 136 of FIG. 1, and query suggestions that are determined to be relevant to the initial input are retrieved. In response to the example initial input [safari], example query suggestions can include [safaris in africa], [safari in tanzania], [safari at home], and [wild safari]. For example, the query suggestion [safaris in africa] includes the initial input [safari] and the completion [s in africa], the search suggestion [safari in tanzania] includes the initial input [safari] and the completion [in tanzania], the search suggestion [safari at home] includes the initial input [safari] and the completion [at home].

In some implementations, user-specific information can be accessed by the query suggestion engine, e.g., the search suggestion engine 132 can retrieve user-specific information from the personal index 138. More particularly, the query suggestion engine can retrieve user-specific information that can be used to generate additional query suggestions. In the depicted example, the user entering the initial search query [safari] may have a safari in Tanzania scheduled in the upcoming weeks, e.g., recorded in a computer-implemented calendar service. In such an example, the user may be presented with the query suggestion of [my safari in Tanzania].

In some implementations, the query suggestion engine provides the list of query suggestions for display to the searching user and to a search engine, e.g., the search engine 134 of FIG. 1. For example, the list of query suggestions and data associated with one or more of the query suggestions can be provided to a client computing device of the searching user for display to the user. In the example of FIG. 2, a dropdown menu 206 is displayed below the search box 202 and is populated with the query suggestions determined by the query suggestion engine. The dropdown menu 206 includes a query suggestion 208 for [safari in tanzania]. In some implementations, the query suggestion 208 may indicate that the searching user has previously searched for the search term, or that the query suggestion 208 is a popular search term. The drop-down menu 206 also includes a personal query suggestion 210 for [my safari in tanzania]. The personal query suggestion 210 can be provided based on user-specific information retrieved from the personal index 138. For example, the user-specific information can indicate that the searching user has a safari in Tanzania scheduled in the near future. In such a case, the search service may determine that the user might be interested in information related to the scheduled safari, and present the personal query suggestion 210.

In some implementations, the highest ranking query suggestion is provided to the search engine and preliminary search results are generated based on the query suggestion. For example, the search engine, e.g., the search engine 134 of FIG. 1, can access a resource index, e.g., the resource index 140 of FIG. 1, to identify one or more search results relevant to the query suggestion. The one or more search results can be provided for display to the user. In the depicted example, preliminary search results 220 are identified based on the query suggestion [safari in tanzania] 208 and are displayed to the user. If the user selects the query suggestion [safari in tanzania] as the search query, e.g., clicks on [safari in tanzania] in the dropdown menu 206, the preliminary search results 220 can be provided as final search results. If, however, the user selects another query suggestion, e.g., clicks on [safari at home] in the dropdown menu 206, the preliminary search results 220 are replaced with search results that correspond to the selected query.

In some implementations, the search results are not displayed until after the searching user has selected a query suggestion. For example, in response to the searching user selecting the query suggestion, a search query is submitted, search results responsive to the search query are received and are displayed to the searching user.

Figure 3:
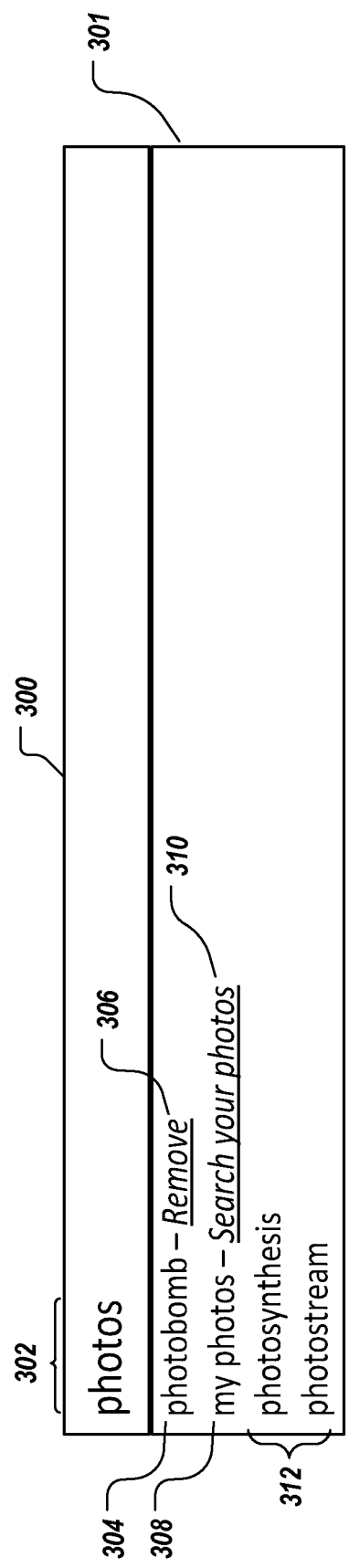
FIG. 3 is a representation of an example search box showing personalized query suggestions and non-personalized query suggestions.

FIG. 3 is a representation of an example search box 300 showing personalized query suggestions and non-personalized query suggestions. The example search box 300 has been populated with an initial search query 302 containing the text [photos]. In response to the initial search query 302, the example search box 300 displays a drop-down menu 301 including one or more query suggestions. In the depicted example, the drop-down menu 301 includes a previously-searched query 304 containing the text [photobomb]. In some examples, the previously-searched search query 304 indicates that the searching user has previously searched for the string [photobomb]. In the depicted example, the previously-searched search query 304 is associated with a remove link 306, which the user can select to remove the search query 304.

In the depicted example, the drop-down menu 301 also includes a personal query suggestion 308 containing the text [my photos]. In some examples, the personal query suggestion 308 can be provided in response to user-specific information, e.g., from the personal index 138, indicating that the user uses a photo-sharing service. In the depicted example, the personal search suggestion 308 is provided with a link to the photo service. In some examples, a description, e.g., a description 310, is displayed next to each personal query suggestion, e.g., the query suggestion 308 in the drop-down menu 301. In some examples, the description explains to the searching user the action clicking the respective personal query suggestion will perform. In some examples, the personal query suggestion 308 may include additional text indicating a form of query the user can issue. For example, the suggestion may contain the text [my photos on date] where the text "date" or "on date" is augmented, e.g., italicized, colored in grey, to convey to the user that they can issue a query of this form.

In the depicted example, the drop-down menu 301 also includes general query suggestions 312, e.g., [photosynthesis] and [photostream]. The general query suggestions 312 can include popular search queries across users of the search service.

Figure 4:
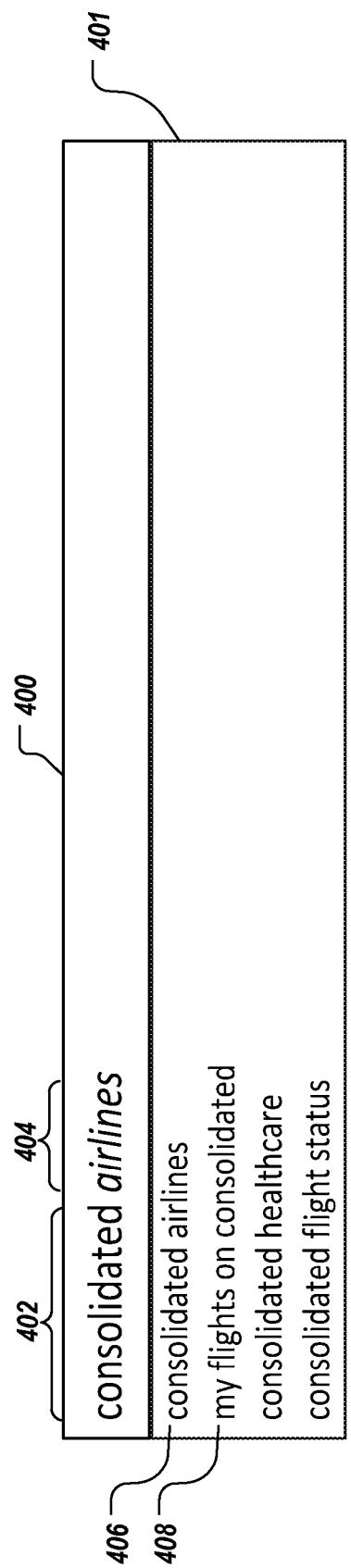
FIG. 4 is a representation of an example search box showing a personalized query suggestion presented in response to an example query.

FIG. 4 is a representation of an example search box 400 showing a personalized query suggestion presented in response to an example query. The example search box 400 has been populated with an initial search query 402 containing the text [consolidated]. In response to the initial search query 402, the example search box 400 displays a drop-down menu 401 including one or more query suggestions. In the depicted example, the drop-down menu 401 includes a query suggestion 406 containing the text [consolidated airlines]. In some examples, the query suggestion 406 can be presented in response to an indication that the user has previously searched using this search query, or that this search query is frequently submitted to the search service by users of the search service. In the depicted example, the initial search query 402 has been attended with an auto-completion 404 corresponding to the query suggestion 406. In some examples, the auto-completion 404 is automatically added in response to presenting the drop-down menu 401, and corresponds to the first query suggestion provided in the drop-down menu 401.

In the depicted example, the drop-down menu 401 also includes a personal query suggestion 408 containing the text [my flights on consolidated]. In some implementations, the personal query suggestion 408 can be provided in response to an indication that the searching user has and/or had flights scheduled on an airline reflected in the initial search query 402. In some examples, the personal query suggestion 408 can be associated with a link, e.g., to calendar appointments in a calendar service associated with the flights. In some examples, the personal query suggestion 408 can be associated with a link to a flight status page associated with the airline. In some implementations, the search service may perform additional processing to attempt to determine an appropriate link for the searching user. For example, if the searching user has a flight scheduled for today, search service can determine that the user is most likely trying to check-in to the flight and provide an appropriate link. As another example, if the user was searching several weeks from the flight, a link to flight information can be provided.

Figure 5:
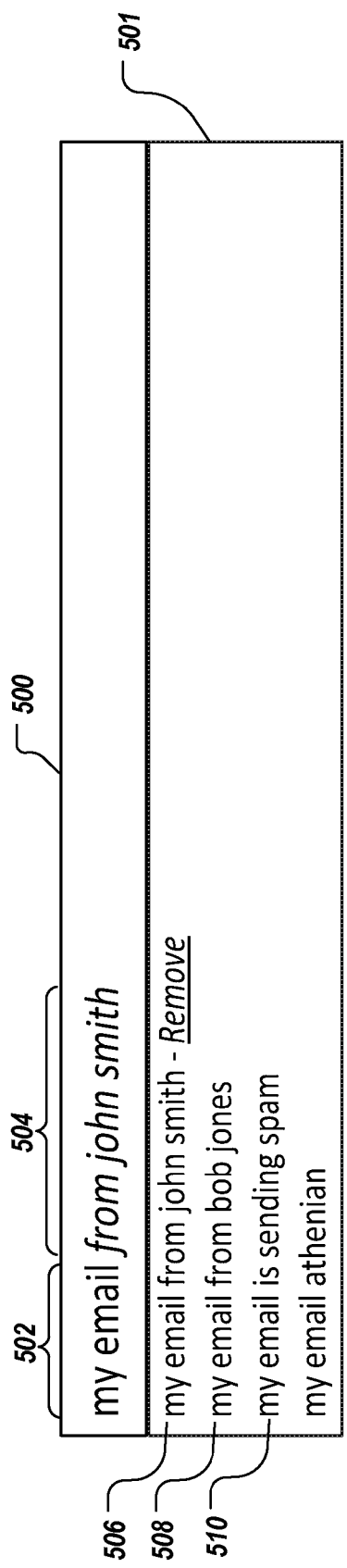
FIG. 5 is a representation of an example search box showing a personalized query suggestion presented based on user information.

FIG. 5 is a representation of an example search box 500 showing a personalized query suggestion presented based on user information. The example search box 500 has been populated with an initial search query 502 containing the text [my email]. In response to the entry of the initial search query 502, the example search box 500 displays a drop-down menu 501 including one or more query suggestions. In the depicted example, the drop-down menu 501 includes a query suggestion 506 containing the text [my email from john smith]. In the example, the search suggestion 506 represents a previous personal search. In this case, the searching user has previously searched for [my email from john smith], e.g., as indicated by the remove link associated with the query suggestion 506. In some examples, previous personal searches are treated identically to all previous searches for the searching user and are suggested in the same way.

In the depicted example, the initial search query 502 in the example search box 501 has been appended with a completion 504 corresponding to the query suggestion 506. In some implementations, the completion 504 is automatically added in response to presenting the drop-down menu 501, and corresponds to the first query suggestion in the drop-down menu 501.

The drop-down menu 501 includes a personal query suggestion 508 containing the text [my email from bob jones]. In some implementations, the personal query suggestion 508 indicates that the user has received an electronic message in an electronic message service from the sender named "Bob Jones," and can be associated with a link to the specific electronic message. In some examples, the personal query suggestion 508 can indicate that the user frequently receives electronic messages from "Bob Jones," and can be associated with a link to multiple electronic messages from "Bob Jones."

In the depicted example, the drop-down menu 501 also includes a query suggestion 510 containing the text [my email is sending spam]. In this example, the query suggestion 510 is not a personal query suggestion, even though it appears to be formatted as a personal query suggestion. This example illustrates that contents of the searching user's initial search query, e.g., [my email], can also result in non-personal query suggestions being presented.

Implementations of the present disclosure have been discussed herein with reference to an example context including search queries submitted to a computer-implemented search service. It is contemplated, however, that implementations of the present disclosure can be provided in other contexts. For example, implementations of the present disclosure can be provided with any appropriate computer-implemented service that enables users to submit queries.

Figure 6:
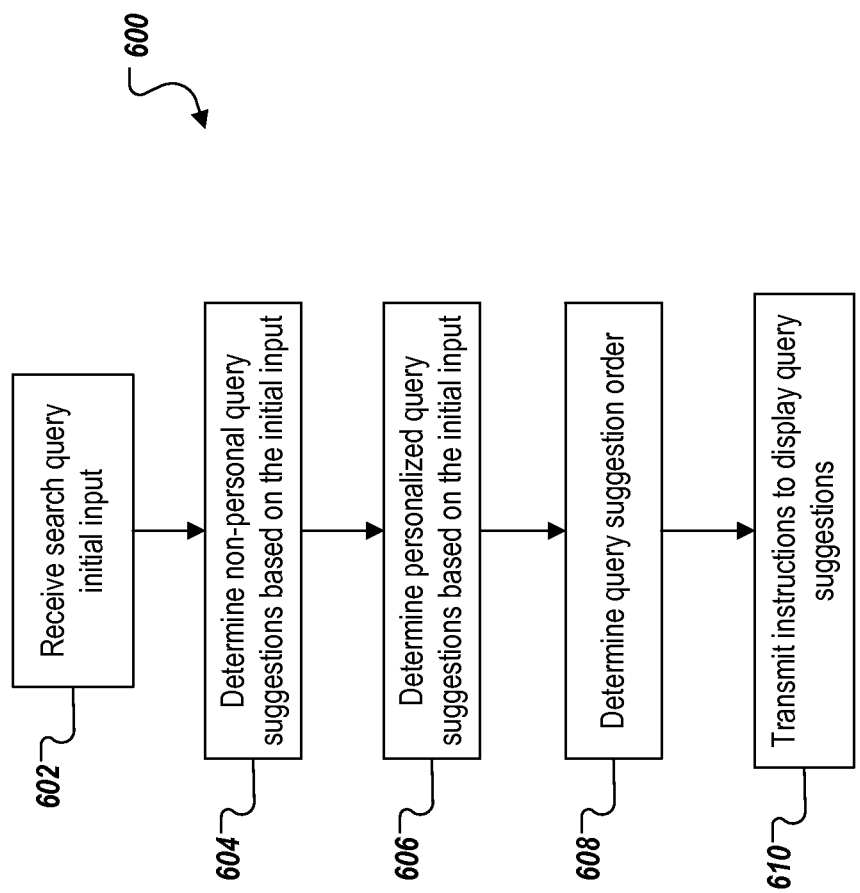
FIG. 6 is a flow diagram of an example process that can be executed in implementations of the present disclosure.

FIG. 6 is a flow diagram of an example process 600 that can be executed in implementations of the present disclosure. The example process 600 can be implemented in one or more software programs executed using one or more computing devices, e.g., client devices 102-110 and/or the server system 112 of FIG. 1.

A search query initial input is received (602). For example, a user of a client computing device enters the initial input into a search box of a web page of a search service, and the initial input is transmitted to the search service. Non-personal query suggestions are determined based on the initial input (604). For example, non-personal query suggestions can include query suggestions that are determined to be popular among users of a search system in aggregate. Personalized query suggestions are determined based on the search query initial input (606). In some examples, the one or more personalized query suggestions can indicate at least one of user data associated with the user and one or more services used by the user. For example, for a search query initial input of [photos], the determined personalized query suggestions may include a suggestion of [my photos] based on an indication that the user uses a computer-implemented image sharing service. A query suggestion order is determined (608), For example, an order of non-personalized and personalized query suggestions relative to one another can be determined. Instructions are transmitted to display the query suggestions to the user (610). For example, personalized query suggestions and/or non-personalized query suggestions can be provided for display in the query suggestion order.

Implementations of the present disclosure and all of the functional operations described in this specification can be realized using digital electronic circuitry, or in computer software, firmware, or hardware, including the structures disclosed in this specification and their structural equivalents, or in combinations of one or more of them. Implementations of the present disclosure can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input.

Implementations of the present disclosure can be provided in a computing system that includes a back-end component, e.g., as a data server, or that includes a middleware component, e.g., an application server, or that includes a front-end component, e.g., a client computer having a graphical user interface or a Web browser through which a user can interact with an implementation of the present disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as descriptions of features specific to particular implementations of the present disclosure. Certain features that are described in this specification in the context of separate implementations can also be implemented in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method executed using one or more processors, the method comprising:
   receiving, by the one or more processors, a query initial input from a user, the query initial input including a first sequence of characters;
   in response to receiving the query initial input, determining a set of personalized content-based query suggestions, by a computer-implemented search service, based on i) the query initial input and ii) user-specific information, the user-specific information based on at least one of user data associated with the user within one or more computer-implemented services and use of the one or more computer-implemented services by the user, wherein the one or more computer-implemented services include computer-implemented services other than the computer-implemented search service;
   identifying a particular personalized content-based query suggestion of the set of personalized content-based query suggestions;
   appending a completion corresponding to the particular personalized content-based query suggestion to the query initial input to provide an updated query, wherein the completion includes a second sequence of characters including at least a portion of the first sequence of characters of the query initial input; and
   transmitting instructions to display i) the set of personalized query suggestions and ii) the updated query to the user.

2. The method of claim 1, further comprising determining a rank order of the personalized content-based query suggestions in the set of personalized content-based query suggestions, the personalized content-based query suggestions being displayed in the rank order.

3. The method of claim 2, wherein the rank order is determined based on at least one of a relevance, frequency of use of the one or more computer-implemented services, and user content associated with the one or more computer-implemented services.

4. The method of claim 2, wherein the rank order is based on types of query suggestions in the set of personalized content-based query suggestions.

5. The method of claim 1, wherein each of the personalized one or more content-based query suggestions is associated with a computer-implemented service of the one or more computer-implemented services, with which the user has a level of engagement that exceeds a threshold level of engagement.

6. The method of claim 1, further comprising retrieving one or more search results that are responsive to the particular personalized content-based query suggestion.

7. The method of claim 6, further comprising:
identifying the particular personalized content-based query suggestion as a highest ranking personalized content-based query suggestion of the set of personalized content-based query suggestions, wherein the selection is an automatic selection in response to the particular personalized content-based query suggestion being the highest ranking personalized content-based query suggestion; and
transmitting instructions to display one or more search results associated with the highest ranking personalized content-based query suggestion as preliminary search results.

8. The method of claim 1, further comprising determining a set of history-based query suggestions, each history-based query suggestion reflecting a query previously submitted by the user.

9. The method of claim 1, wherein the set of personalized content-based query suggestions comprise at least one of content generated by the user within the one or more computer-implemented services, content received by the user within the one or more computer-implemented services, and indicating use by the user of the one or more computer-implemented services.

10. A system comprising:
a data store for storing data; and
one or more processors configured to interact with the data store, the one or more processors being further configured to perform operations comprising:
receiving a query initial input from a user, the query initial input including a first sequence of characters;
in response to receiving the query initial input, determining a set of personalized content-based query suggestions, by a computer-implemented search service, based on i) the query initial input and ii) user-specific information, the user-specific information based at least one of user data associated with the user within one or more computer-implemented services and use of the one or more computer-implemented services by the user, wherein the one or more computer-implemented services include computer-implemented services other than the computer-implemented search service;
identifying a particular personalized content-based query suggestion of the set of personalized content-based query suggestions;
appending a completion corresponding to the particular personalized content-based query suggestion to the query initial input to provide an updated query, wherein completion includes a second sequence of characters including at least a portion of the first sequence of characters of the query initial input; and
transmitting instructions to display i) the set of personalized query suggestions and ii) the updated query to the user.

11. The system of claim 10, wherein operations further comprise determining a rank order of the personalized content-based query suggestions in the set of personalized content-based query suggestions, the personalized content-based query suggestions being displayed in the rank order.

12. The system of claim 11, wherein the rank order is determined based on at least one of a relevance, frequency of use of the one or more computer-implemented services, and user content associated with the one or more computer-implemented services.

13. The system of claim 11, wherein the rank order is based on types of query suggestions in the set of personalized content-based query suggestions.

14. The system of claim 10, wherein each of the personalized content-based query suggestions is associated with a computer-implemented service of the one or more computer-implemented services, with which the user has a level of engagement that exceeds a threshold level of engagement.

15. The system of claim 10, wherein operations further comprise retrieving one or more search results that are responsive to the particular personalized content-based query suggestion.

16. The system of claim 15, wherein operations further comprise:
identifying the particular personalized content-based query suggestion as a highest ranking personalized content-based query suggestion of the set of personalized content-based query suggestions, wherein the selection is an automatic selection in response to the particular personalized content-based query suggestion being the highest ranking personalized content-based query suggestion; and
transmitting instructions to display one or more search results associated with the highest ranking personalized content-based query suggestion as preliminary search results.

17. The system of claim 10, further comprising determining a set of history-based query suggestions, each history-based query suggestion reflecting a query previously submitted by the user.

18. The system of claim 10, wherein the set of personalized content-based query suggestions comprise at least one of content generated by the user within the one or more computer-implemented services, content received by the user within the one or more computer-implemented services, and indicating use by the user of the one or more computer-implemented services.

19. A non-transitory computer readable medium storing instructions that, when executed by one or more processors, cause the one or more processors to perform operations comprising:
receiving a query initial input from a user, the query initial input including a first sequence of characters;
in response to receiving the query initial input, determining a set of personalized content-based query suggestions, by a computer-implemented search service, based on i) the query initial input and ii) user-specific information, the user-specific information based on at least one of user data associated with the user within one or more computer-implemented services and use of the one or more computer-implemented services by the user, wherein the one or more computer-implemented services include computer-implemented services other than the computer-implemented search service;
identifying a particular personalized content-based query suggestion of the set of personalized content-based query suggestions;
appending a completion corresponding to the particular personalized content-based query suggestion to the query initial input to provide an updated query, wherein the completion includes a second sequence of characters including at least a portion of the first sequence of characters of the query initial input; and
transmitting instructions to display i) the set of personalized query suggestions and ii) the updated query to the user.

20. The non-transitory computer readable medium of claim 19, wherein operations further comprise determining a rank order of the personalized content-based query suggestions in the set of personalized content-based query suggestions, the personalized content-based query suggestions being displayed in the rank order.

21. The non-transitory computer readable medium of claim 20, wherein the rank order is determined based on at least one of a relevance, frequency of use of the one or more computer-implemented services, and user content associated with the one or more computer-implemented services.

22. The non-transitory computer readable medium of claim 20, wherein the rank order is based on types of query suggestions in the set of personalized content-based query suggestions.

23. The non-transitory computer readable medium of claim 19, wherein each of the personalized one or more content-based query suggestions is associated with a computer-implemented service of the one or more computer-implemented services, with which the user has a level of engagement that exceeds a threshold level of engagement.

24. The non-transitory computer readable medium of claim 19, wherein operations further comprise retrieving one or more search results that are responsive to the particular personalized content-based query suggestion.

25. The non-transitory computer readable medium of claim 24, wherein operations further comprise:
   identifying the particular personified content-based query suggestion as a highest ranking personalized content-based query suggestion of the set of personalized content-based query suggestions, wherein the selection is an automatic selection in response to the particular personalized content-based query suggestion being the highest personalized content-based ranking query suggestion; and
   transmitting instructions to display one or more search results associated with the highest ranking personalized content-based query suggestion as preliminary search results.

26. The non-transitory computer readable medium of claim 19, the operations further comprising determining a set history-based query suggestions, each history-based query suggestion reflecting a query previously submitted by the user.

27. The non-transitory computer readable medium of claim 19, wherein the set of personalized content-based query suggestions comprise at least one of content generated by the user within the one or more computer-implemented services, content received by the user within the one or more computer-implemented services, and indicating use by the user of the one or more computer-implemented services.

* * * * *